July 24, 1956 W. H. LAY 2,756,025
ROCK DRILL
Filed Dec. 29, 1949
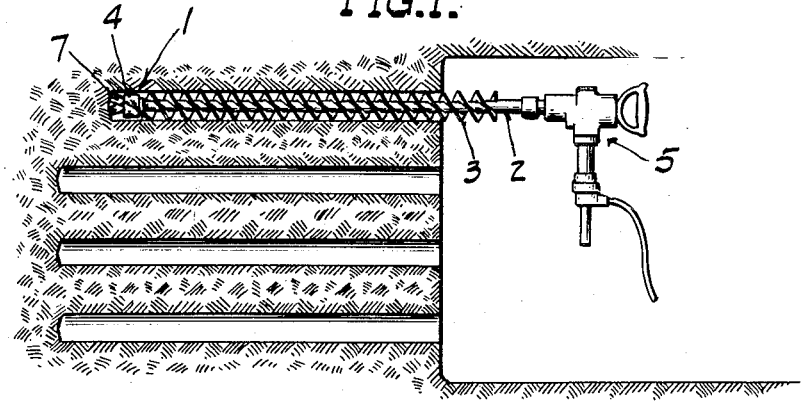
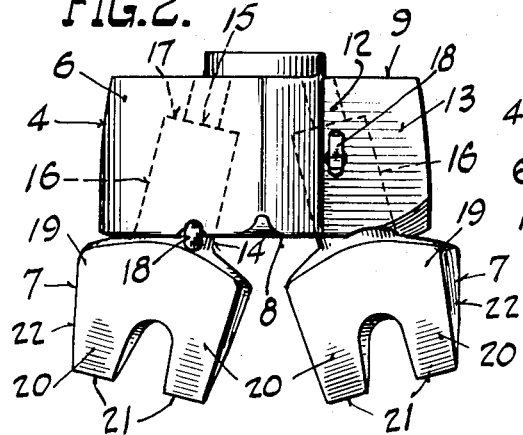
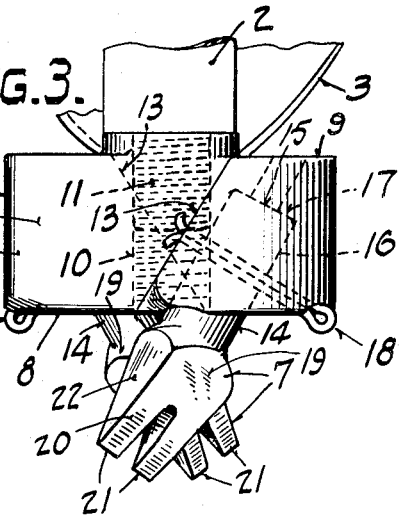
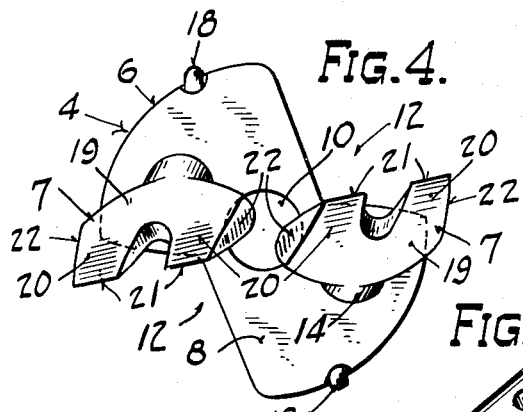
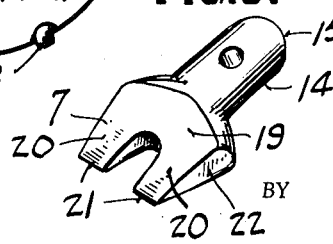
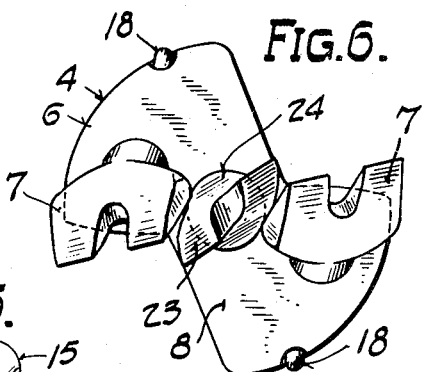
Walter H. Lay
INVENTOR.
ATTORNEYS.

United States Patent Office 2,756,025
Patented July 24, 1956

2,756,025

ROCK DRILL

Walter H. Lay, Chicago, Ill., assignor to Charles W. Kandle, Chicago, Ill.

Application December 29, 1949, Serial No. 135,676

1 Claim. (Cl. 255—61)

This invention relates to drills for forming holes in rock, coal, chalk, gypsum and the like and particularly to the drill head for small diameter drills used in preparing large numbers of horizontal shot holes for blasting charges in excavating operations.

The invention is a continuation in part of the copending application of the present inventor filed June 29, 1949, Serial No. 101,959 now abandoned and provides two or three interchangeable cutters angularly disposed with respect to the rotational axis of the drill head.

An object of the invention is to increase the cutting speed of the drill head so that large numbers of holes may be drilled in less time.

A more particular object of the invention is to eliminate need of a lead screw for purposes of centering the drill.

Another object is to facilitate replacement of the cutting elements.

Another object is to provide for reversing of the cutting elements whereby the serviceable life of the drill may be approximately doubled.

Another object is to arrange the cutters so that soft rock and hard clay is broken up only to the extent necessary that the spoil will be carried by the flights of the drill in removal of the latter from the holes.

These and other objects and advantages will be more fully set forth in the following description of a preferred embodiment of the invention as illustrated in the accompanying drawing.

In the drawing:

Figure 1 is a generally schematic elevation of a drill operating in a hole being prepared for extending an excavation;

Fig. 2 is an enlarged side elevation of the drill head;

Fig. 3 is a view similar to Fig. 2 with the drill head turned 90°;

Fig. 4 is an enlarged bottom plan view of the drill head;

Fig. 5 is a perspective view of one of the cutters; and

Fig. 6 is an enlarged bottom plan view of the drill head illustrating another embodiment of the invention.

The earth drill 1 shown in the drawing comprises the shank 2, the spiral flight 3 which extends substantially the length of the shank and the cutting head 4 to which the present invention is directed.

Drill 1 is driven by the air motor 5 which type is used almost exclusively in excavation work and delivers maximum output only at full speeds.

According to the invention, cutter head 4 is particularly adapted to operate with maximum cutting efficiency at high rotational speeds so as to be particularly adapted for use as in preparing a series of comparatively small diameter, relatively deep shot holes in a minimum of time.

The cutter head 4 comprises the cylindrical member 6 which carries the two interchangeable cutters 7, as will be described, angularly with respect to the rotational axis of the drill.

The member 6 has a substantially planiform lower face 8 and an opposite upper face 9. The threaded hole 10 extending axially through head 4 and centrally thereof is adapted to receive the threaded lower reduced end 11 of shank 2 of the drill.

The segmental openings 12 in head 4 are radially spaced 180° about the axis of rotation of head 4 and are formed to provide the corresponding opposite faces 13 which are pitched to correspond with flight 3 and convey the spoil of cutters 7 to the flight for discharge from the hole to be prepared.

Each cutter 7 as shown in Fig. 5 is provided with the round shank member 14 having an end 15. The shank 14 of each cutter fits in the larger end of a stepped bore 16 drilled through head 4 so as to support the cutter in angular relation to the rotational axis. The end 15 of each shank 14 is seated against the shoulder 17 of bore 16 to support the cutter against axial thrust.

Stepped bores 16 have their axes substantially parallel to the faces 13 of head 4 so that cutters 7 are provided with a pitch which corresponds with that of faces 13 and flight 3 and so that spoil will be properly directed to flight 3.

The cotter pins 18 extending through corresponding registering holes in head 4 and shanks 14 of the cutters, secure the latter against displacement in bores 16.

The lower blade end of each cutter 7 has opposite faces 19 and is preferably bifurcated to provide two cutting blades 20 having sharpened lower edges 21 formed where the opposite faces 19 converge.

Cutting blades 20 have outer edges 22 inclined inwardly towards the longitudinal axis of cutters 7 so that the edges 22 of each blade 20 on the outside of the drill engages the periphery of the hole formed by rotation of drill 1 and are inclined so as to be substantially parallel to the axis of rotation of head 4 and drill 1. By having the outer edges 22 substantially parallel to the axis of rotation the sharpened ends 21 formed at the lower end thereof experience less wear than if they were to laterally project substantially beyond their adjacent edges 22.

According to the invention, cutting blades 20 of cutters 7 are angularly disposed with respect to the axis of rotation of the drill so that the lower edges 21 define two lines intersecting obliquely at the axis of rotation and by rotation define a cone or point, and are pitched according to the direction of rotation to lift the spoil upwardly across the forward faces 19 of each cutter 7 and the faces 13 of cutting head 4 to the flight 3. Cutters 7 are thereby also disposed so that the blades face slightly inwardly toward the center of rotation to prevent the spoil from being thrown radially outwardly by the high rotational speeds and building up the sides of the hole, reducing the necessary clearance for the free rotation of the drill.

Cutters 7 are identically formed and each are symmetrical about their longitudinal axes so that they are freely interchangeable and either face 19 of a cutter 7 may be disposed as the leading face to first engage the material being drilled.

Such symmetry makes possible the reversal of edges 22 so that either may be disposed at the periphery of the hole where wear is the greatest. Similarly blades 20 and the sharpened lower edges 21 may be reversed to compensate for unequal wear.

For drilling certain types of rock the center cutter 23 shown in Fig. 6 may be employed to ensure adequate breaking of the rock between cutters 7 and at the center of rotation of the drill. Cutter 23 is provided with the threaded shank 24 adapted to fit the lower end of hole 10 and is assembled with cutter head 4 by removing pins 18 and cutters 7 and then screwing shank 24 of cutter 23 into hole 10.

Cutter 23 is secured against rotation between cutters 7 by the latter upon reassembly. The length or projection of cutter 23 particularly with respect to cutters 7 may be adjusted by turning cutter 23 in hole 10 as required.

In operation, the head 4 and its associated cutters 7 cut away the rock, ahead of other portions of the drill and prepare a face having a slightly conical surface. According to the present invention the cutters 7 and head 4 center the drill in the hole so that no lead screw is required. The elimination of the lead screw avoids various difficulties encountered normally as in reaching hard rock which a lead screw cannot penetrate. The power and thrust required normally to force the lead screw into the hard rock is made available for the cutting operation.

Various embodiments of the invention may be employed within the scope of the accompanying claim.

I claim:

In a high-speed earth drill, a cylindrical head provided with segmental openings disposed oppositely respecting the axis of rotation and having pitched faces disposed to lift the spoil through the openings, corresponding cylindrical bores formed in said head generally parallel to said inclined faces and opening downwardly and forwardly of the head, a symmetrically formed cutting member having a shank disposed and seated within each corresponding bore in said head and projecting in advance of said head with the cutting edge of said member disposed substantially at right angles to the projected axis of the respective shank and in angular relation to a plane normal to the axis of rotation of the head to constitute a unitary cutting blade, the cutting edges of the respective blades defining two lines intersecting obliquely at the axis of drill rotation to define a cone or point, each blade being pitched according to the direction of drill rotation to lift the spoil from the hole and facing slightly inwardly toward said axis to prevent throwing the spoil against the side of the hole, the outermost side face of each blade projecting radially beyond the outer dimensions of said head to engage the wall of the hole being drilled and guide the drill, each of said unitary cutting blades being reversible in the respective bore to dispose either side of the same outwardly.

References Cited in the file of this patent

UNITED STATES PATENTS

| | | |
|---|---|---|
| 1,063,982 | Larnce | June 10, 1913 |
| 1,077,772 | Weathersby | Nov. 4, 1913 |
| 1,176,273 | Chismer | Mar. 21, 1916 |
| 1,411,772 | Ellis | Apr. 4, 1922 |
| 1,576,693 | Walker | Mar. 16, 1926 |
| 1,789,399 | Bartenbach et al. | Jan. 20, 1931 |
| 1,807,148 | Brown | May 26, 1931 |
| 1,887,372 | Emmons | Nov. 8, 1932 |
| 1,902,885 | Nixon | Mar. 28, 1933 |
| 2,090,058 | Mangels | Aug. 17, 1937 |
| 2,109,613 | Cook | Mar. 1, 1938 |
| 2,188,631 | Kraus | Jan. 30, 1940 |
| 2,320,610 | Kandle | June 1, 1943 |
| 2,320,612 | Kandle | June 1, 1943 |
| 2,504,978 | Henning | Apr. 25, 1950 |
| 2,510,751 | McLaughlin | June 6, 1950 |

FOREIGN PATENTS

| | | |
|---|---|---|
| 178,621 | Great Britain | Apr. 27, 1922 |